United States Patent
Price et al.

(10) Patent No.: US 8,507,422 B2
(45) Date of Patent: Aug. 13, 2013

(54) ANTIWEAR POLYMER AND LUBRICATING COMPOSITION THEREOF

(75) Inventors: David Price, Littleover (GB); Patrick E. Mosier, Bay Village, OH (US); Jonathan S. Vilardo, Chardon, OH (US); Marina Baum, Chagrin Falls, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 1005 days.

(21) Appl. No.: 12/104,915

(22) Filed: Apr. 17, 2008

(65) Prior Publication Data

US 2008/0269093 A1 Oct. 30, 2008

Related U.S. Application Data

(60) Provisional application No. 60/914,100, filed on Apr. 26, 2007.

(51) Int. Cl.
*C10M 145/14* (2006.01)
*C10L 1/18* (2006.01)
*C10L 1/22* (2006.01)

(52) U.S. Cl.
USPC ............................ 508/469; 508/466; 508/470

(58) Field of Classification Search
USPC ................ 508/186, 421, 441, 287, 469, 466, 508/470
See application file for complete search history.

(56) References Cited

U.S. PATENT DOCUMENTS

| | | | |
|---|---|---|---|
| 5,070,131 A | 12/1991 | Rhodes et al. | |
| 5,552,491 A | 9/1996 | Mishra et al. | |
| 5,922,657 A | 7/1999 | Camenzind et al. | |
| 5,955,405 A | 9/1999 | Liesen et al. | |
| 6,046,144 A | 4/2000 | Karol et al. | |
| 6,576,346 B1 | 6/2003 | Ravenscroft et al. | |
| 2002/0010103 A1 | 1/2002 | Takayama et al. | |
| 2004/0259743 A1 | 12/2004 | Butke | |
| 2006/0189490 A1* | 8/2006 | Dardin et al. | 508/469 |
| 2007/0197409 A1 | 8/2007 | Scherer et al. | |
| 2007/0213237 A1 | 9/2007 | Scherer et al. | |
| 2008/0146475 A1 | 6/2008 | Mueller et al. | |
| 2009/0209440 A1* | 8/2009 | Tipton et al. | 508/186 |

FOREIGN PATENT DOCUMENTS

| | | | |
|---|---|---|---|
| WO | 2006047393 A1 | | 5/2006 |
| WO | 2006047398 A2 | | 5/2006 |
| WO | WO 2006/047398 | * | 5/2006 |
| WO | 2007025837 A2 | | 3/2007 |
| WO | 2007127615 A2 | | 11/2007 |
| WO | 2007127660 A1 | | 11/2007 |
| WO | 2007127661 A1 | | 11/2007 |
| WO | 2007127663 A2 | | 11/2007 |

\* cited by examiner

*Primary Examiner* — James Goloboy
*Assistant Examiner* — Latosha Hines
(74) *Attorney, Agent, or Firm* — Michael F. Esposito; David M. Shold

(57) ABSTRACT

The present invention relates to the use of a RAFT polymer as an antiwear agent in a lubricant. The lubricant may be useful in a number of mechanical devices.

13 Claims, No Drawings

ANTIWEAR POLYMER AND LUBRICATING COMPOSITION THEREOF

FIELD OF INVENTION

The present invention relates to the use of a RAFT polymer as an antiwear agent in a lubricant. The lubricant may be useful in a number of mechanical devices.

BACKGROUND OF THE INVENTION

The use of antiwear agents in lubricating compositions is known. The antiwear agent may be either ash-containing or ashless lubricating compositions. The ashless and ash-containing antiwear agents may be employed in a wide variety of mechanical devices including hydraulic systems, driveline systems and internal combustion engines.

Typically, additives that tend to decompose are often ash-containing additives that contain a metal and often phosphorus (such as zinc dialkyldithiophosphate). Furthermore, as ash-containing antiwear agents decompose, divalent metals such as zinc, calcium or magnesium, are released into the lubricating composition. Once released, the metal may have a detrimental impact on filters (by causing filter plugging), poison catalysts or other after-treatment devices, cause other pollution, or increase sludge or sediment. In addition, ashless antiwear agents are believed to have at least one of limited oxidative stability, limited thermal stability, and produce unacceptable levels of sludge.

In addition, ashless and ash-containing antiwear agents are believed to be consumed relatively quickly compared with a general lubricant change cycle, consequently increasing wear.

European Patent Application EP 0 821 053 A2, International Applications WO 00/11122 and WO 04/113479, US Patent Application 2002/0010103, and U.S. Pat. No. 5,922,657, all disclose ashless antiwear packages for hydraulic fluids.

US Application US 2006/0189490 (equivalent to WO 04/087850) and WO 07/025,837 both disclose lubricating composition containing block copolymers prepared from RAFT (Reversible Addition Fragmentation Transfer) or ATRP (Atom Transfer Radical Polymerisation) polymerisation processes.

International Applications WO 06/047393, WO 06/047398, WO 07/127,615 (U.S. 60/745,422), WO 07/127,660 (U.S. 60/745,420), WO 07/127,663 (U.S. 60/745,417), and WO 07/127,661 (U.S. 60/745,425) all disclose RAFT polymers for lubricants. The RAFT polymers provide thickening to a lubricant.

International Application WO 96/23012 discloses star-branched polymers prepared from acrylic or methacrylic monomers. The polymers have a core or nucleus derived from acrylate or methacrylate esters of polyols. Further the polymers have molecular weights and other physical characteristics that make them useful for lubricating oil compositions. The star-branched polymers disclosed are prepared by anionic polymerisation techniques.

The star polymers of EP 979 834 require from 5 to 10 weight percent of a C16 to C30 alkyl (meth)acrylate and from 5 to 15 weight percent of butyl methacrylate. A viscosity index improver with a C16 to C30 alkyl (meth)acrylate monomer present at 5 weight percent or more has reduced low temperature viscosity performance because the polymer has a waxy texture.

U.S. Pat. No. 5,070,131 discloses gear oil compositions having improved shear stability index essentially consisting of gear oil, a viscosity index improver comprising a hydrogenated star polymer comprising at least four arms, the arms comprising, before hydrogenation, polymerized conjugated diolefin monomer units and the arms having a number average molecular weight within the range of 3,000 to 15,000.

None of the polymer references listed above disclose lubricating compositions that simultaneously achieve acceptable viscosity index (VI), oil blend thickening capabilities, improved fuel economy, good shear stability, good low temperature viscosity performance, and low viscosity modifier treatment level whilst maintaining the appropriate lubricating antiwear performance for a mechanical device.

Thus there is a need for antiwear agent capable of providing acceptable wear performance over the general lubricant change cycle, whilst not having a detrimental impact on at least one of viscosity index (VI), oil blend thickening capabilities, fuel economy, shear stability, low temperature viscosity performance, and viscosity modifier treatment level. In addition it would be more desirable if the antiwear agent also has no detrimental impact on filter plugging, poisoning of catalyst or other after treatment devices, pollution levels, or accumulation of sludge and/or sediment. The present invention provides a solution to the problem highlighted above.

SUMMARY OF THE INVENTION

In one embodiment the invention provides for a method of controlling wear in a mechanical device, the method comprising supplying to the mechanical device a lubricant comprising (i) a polymer obtained/obtainable from a RAFT polymerisation process (or often referred to as a reversible addition-fragmentation chain transfer controlled radical polymerisation process), and (ii) an oil of lubricating viscosity.

In one embodiment the invention provides for a method of controlling wear in a mechanical device, the method comprising supplying to the mechanical device a lubricant comprising (i) a RAFT polymer, and (ii) an oil of lubricating viscosity.

The RAFT polymer is believed to be an antiwear agent.

In one embodiment the invention provides for the use of a polymer obtained/obtainable from a RAFT polymerisation process (or often referred to as a reversible addition-fragmentation chain transfer controlled radical polymerisation process) as an antiwear agent in a lubricant.

In one embodiment the invention provides for the use of a RAFT polymer as an antiwear agent in a lubricant.

In one embodiment the lubricant is suitable for use in a mechanical device.

DETAILED DESCRIPTION OF THE INVENTION

As used herein the term "RAFT" means a reversible addition-fragmentation chain transfer controlled radical polymerisation process, a process which is believed to have living characteristics.

RAFT Polymer

As used herein terms such as "the Polymer has (or contains) monomers composed of" means the polymer comprises units derived from the particular monomer referred to.

As used herein the term "(meth)acrylate" means acrylate or methacrylate units.

The RAFT polymer may be linear or star. In one embodiment the RAFT polymer is a star polymer.

In different embodiments the RAFT polymer may contain about 20 wt % or more, 50 wt % or more, or about 55 wt % or more, or about 70 wt % or more, or about 90 wt % or more, or about 95 wt % or more, or about 100 wt % of a non-diene monomer (that is to say, non-diene monomer units or units derived from polymerisation of one of more non-diene monomers). Examples of diene monomers include 1,3-butadiene or isoprene. Examples of a non-diene or mono-vinyl monomer include styrene, methacrylates, or acrylates.

In one embodiment the RAFT polymer may be derived from 20 wt % or more of a mono-vinyl monomer, wherein the RAFT polymer has a weight average molecular weight of 1,000 to 1,000,000, and wherein the RAFT polymer has star architecture.

When the RAFT polymer is a star polymer, the amount of mono-vinyl monomer as described above refers only to the composition of the polymeric arms, i.e., the wt % values as given are exclusive of any di-functional (or higher) monomer found in a polymer core.

As described hereinafter the molecular weight of the viscosity modifier has been determined using known methods, such as GPC analysis using polystyrene standards. Methods for determining molecular weights of polymers are well known. The methods are described for instance: (i) P. J. Flory, "Principles of Polymer Chemistry", Cornell University Press 91953), Chapter VII, pp 266-315; or (ii) "Macromolecules, an Introduction to Polymer Science", F. A. Bovey and F. H. Winslow, Editors, Academic Press (1979), pp 296-312. As used herein the weight average and number weight average molecular weights of the polymers of the invention are obtained by integrating the area under the peak corresponding to the RAFT polymer of the invention, which is normally the major high molecular weight peak, excluding peaks associated with diluents, impurities, uncoupled polymer chains and other additives. Typically, the RAFT polymer of the invention has star architecture.

The weight average molecular weight of the RAFT polymer may be in the range of 1,000 to 1,000,000.

As used herein the shear stability may be determined by a 20 hour KRL test (Volkswagen Tapered Bearing Roller Test). The test procedure is set out in both CEC-L-45-A-99 and DIN 51350-6-KRL/C. The shear stability index (SSI) is calculated from the formula SSI=100×(fluid viscosity before shear–fluid viscosity after shear)/(fluid viscosity before shear–fluid viscosity without VM). The RAFT polymer SSI may be in the range of 0 to 100, or 10 to 90. Typically the Volkswagen Tapered Bearing Roller Test is suitable for defining polymers suitable for driveline applications or hydraulic fluids.

The weight average molecular weight of the RAFT polymer suitable for a driveline automatic transmission fluid may be in the range of 100,000 to 500,000, or 125,000 to 400,000, or 175,000 to 375,000, or 225,000 to 325,000.

The weight average molecular weight of the RAFT polymer suitable for a driveline manual transmission or axle fluid may be in the range of 2,000 to 20,000, or 8,000 to 150,000, or 10,000 to 100,000, or 15,000 to 75,000, or 25,000 to 70,000.

The weight average molecular weight of the RAFT polymer suitable for a hydraulic fluid may be 50,000 to 1,000,000, or 100,000 to 800,000, or 120,000 to 700,000.

In one embodiment the RAFT polymer may have a shear stability of 40% or less as measured by ASTM D6278 at 100° C. (or CEC-L-14A-93, except shear measurements are determined after 30 cycles at 100° C.). In different embodiments the shear stability is such that the final lubricating composition (after testing) has a viscosity decrease of less than 30%, or 20% or less, or 15% or less, or 10% or less. Typically, ASTM D6278 is suitable for measuring shear stability of internal combustion lubricants containing viscosity modifiers.

The weight average molecular weight of the RAFT polymer suitable for an internal combustion engine may be 100,000 to 1,000,000, or 200,000 to 1,000,000, or 300,000 to 1,000,000, or 350,000 to 1,000,000, or 400,000 to 800,000.

The RAFT polymer may be a homopolymer or a copolymer. In one embodiment the RAFT polymer is a copolymer. The RAFT polymer may have a branched, a comb-like, a radial or a star architecture. The RAFT polymer may be a polymer having a random, tapered, di-block, tri-block or multi-block architecture. Typically the RAFT polymer has random or tapered architecture.

When the RAFT polymer has branched, comb-like, or star architecture, the RAFT polymer has polymeric arms. For such materials, the polymeric arms may have block architecture, or hetero arm architecture, or tapered-block architecture. Tapered-block architecture has a variable composition across the length of a polymer arm. For example, a tapered-block arm may be composed of, at one end, a relatively pure first monomer and, at the other end, a relatively pure second monomer. The middle of the arm is more of a gradient composition of the two monomers.

The RAFT polymer derived from a block-arm typically contains one or more polymer arms derived from two or more monomers in block structure within the same arm. A more detailed description of the block-arm is given in Chapter 13 (pp. 333-368) of "Anionic Polymerization, Principles and Practical Applications" by Henry Hsieh and Roderic Quirk (Marcel Dekker, Inc, New York, 1996) (hereinafter referred to as Hsieh et al.).

The hetero-arm, or "mikto-arm," polymeric arm architecture typically contains arms which may vary from one another either in molecular weight, composition, or both, as defined in Hsieh et al., cited above. For example, a portion of the arms of a given polymer may be of one polymeric type and a portion of a second polymeric type. More complex hetero-arm polymers may be formed by combining portions of three or more polymeric arms with a coupling agent.

When the RAFT polymer has star architecture the polymeric arms may be chemically bonded to a core portion. The core portion may be a polyvalent (meth) acrylic monomer, oligomer, polymer, or copolymer thereof, or a polyvalent non-acrylic monomer, oligomer polymer, or copolymer thereof. In one embodiment the polyvalent non-acrylic monomer is divinyl benzene. In one embodiment the polyvalent (meth)acrylic monomer is an acrylate or methacrylate ester of a polyol or a methacrylamide of a polyamine, such as an amide of a polyamine, for instance a methacrylamide or an acrylamide. In different embodiments the polyvalent (meth) acrylic monomer is (i) a condensation reaction product of an acrylic or methacrylic acid with a polyol or (ii) a condensation reaction product of an acrylic or methacrylic acid with a polyamine.

The polyol which may be condensed with the acrylic or methacrylic acid in one embodiment contains 2 to 20 carbon atoms, in another embodiment 3 to 15 carbon atoms and in another embodiment 4 to 12 carbon atoms; and the number of hydroxyl groups present in one embodiment is 2 to 10, in another embodiment 2 to 4 and in another embodiment 2. Examples of polyols include ethylene glycol, poly (ethylene glycols), alkane diols such as 1,6 hexane diol or triols such as trimethylolpropane, oligomerised trimethylolpropanes such as Boltorn® materials sold by Perstorp Polyols. Examples of polyamines include polyalkylenepolyamines such as ethylenediamine, diethylenetriamine, triethylenetetramine, tetraethylene pentamine, pentaethylenehexamine and mixtures thereof.

Examples of the polyvalent unsaturated (meth)acrylic monomer include ethylene glycol diacrylate, ethylene glycol dimethacrylate, diethylene glycol diacrylate, diethylene glycol dimethacrylate, glycerol diacrylate, glycerol triacrylate, mannitol hexaacrylate, 4-cyclohexanediol diacrylate, 1,4-benzenediol dimethacrylate, neopentylglycol diacrylate, 1,3-propanediol diacrylate, 1,5-pentanediol dimethacrylate, bis-acrylates and bis-methacrylates of polyethylene glycols of molecular weight 200-4000, polycaprolactonediol diacrylate, 1,1,1-trimethylolpropane diacrylate, 1,1,1-trimethylolpropane triacrylate, pentaerythritol diacrylate, pentaerythritol triacrylate, pentaerythritol tetraacrylate, triethylene glycol diacrylate, triethylene glycol dimethacrylate, 1,1,1-trimethylolpropane trimethacrylate, hexamethylenediol diacrylate or hexamethylenediol dimethacrylate or an alkylene bis-(meth) acrylamide.

The amount of coupling agent may be an amount suitable to provide coupling of polymer previously prepared as arms onto a core comprising the coupling agent in monomeric, oligomeric, or polymeric form, to provide a star RAFT polymer. As described above, suitable amounts may be determined readily by the person skilled in the art with minimal experimentation, even though several variables may be involved. For example, if an excessive amount of coupling agent is employed, or if excessive unreacted monomer from the formation of the polymeric arms remains in the system, crosslinking rather than star formation may occur. Typically the mole ratio of polymer arms to coupling agent may be 50:1 to 1.5:1 (or 1:1), or 30:1 to 2:1, or 10:1 to 3:1, or 7:1 to 4:1, or 4:1 to 1:1. In other embodiments the mole ratio of polymer arms to coupling agent may be 50:1 to 0.5:1, or 30:1 to 1:1, or 7:1 to 2:1. The desired ratio may also be adjusted to take into account the length of the arms, longer arms sometimes tolerating or requiring more coupling agent than shorter arms. Typically the material prepared is soluble in an oil of lubricating viscosity.

In one embodiment the polymeric arms of the RAFT polymer have a polydispersity of 2 or less, or 1.7 or less, or 1.5 or less, for instance, 1 to 1.4 as measured before star polymer formation or on uncoupled units. In one embodiment the overall RAFT polymer composition, which includes the RAFT polymer with star architecture, has polydispersity with a bimodal or higher modal distribution. The bimodal or higher distribution in the overall composition is believed to be partially due to the presence of varying amounts of uncoupled polymer chains and/or uncoupled star-polymers or star-to-star coupling formed as the RAFT polymer is prepared.

The overall composition containing RAFT polymers with the star architecture may thus also have uncoupled polymeric arms present (also referred to as a polymer chain or linear polymer). The percentage conversion of a polymer chain to star polymer may be at least 10%, or at least 20%, or at least 40%, or at least 55%, for instance at least 70%, at least 75% or at least 80%. In one embodiment the conversion of polymer chain to star polymer may be 90%, 95% or 100%. In one embodiment a portion of the polymer chains does not form a star polymer and remains as a linear polymer. In one embodiment the RAFT polymer is a mixture of (i) a polymer with star architecture, and (ii) linear polymer chains (also referred to as uncoupled polymeric arms). In different embodiments the amount of star architecture within the RAFT polymer composition may be 10 wt % to 85 wt %, or 25 wt % to 70 wt % of the amount of polymer. In different embodiments the linear polymer chains may be present at 15 wt % to 90 wt %, or 30 wt % to 75 wt % of the amount of RAFT polymer.

The RAFT polymer with branched, comb-like, star architecture may have 2 or more arms, or 5 or more arms, or 7 or more arms, or 10 or more arms, for instance 3 to 100, or 4 to 50, or 6 to 30, or 8 to 14 arms. The RAFT polymer with branched, comb-like, star architecture may have 120 arms or less, or 80 arms or less, or 60 arms or less.

RAFT polymerisation is described in more detail in the Handbook of Radical Polymerization, edited by Krzysztof Matyjaszewski and Thomas P. Davis, 2002, Chapter 12, pages 629 to 690, published by John Wiley and Sons Inc (hereinafter referred to as "Matyjaszewski et al."). A discussion of the polymer mechanism of RAFT polymerisation is shown on page 664 to 665 in section 12.4.4 of Matyjaszewski et al. Also Methods of preparing RAFT polymers are disclosed in the example section of WO 06/047393, examples 1 to 47.

In RAFT polymerisation, chain transfer agents are important. A more detailed review of suitable chain transfer agents is found in paragraphs 66 to 71 of WO 06/047393. Examples of a suitable RAFT chain transfer agent include benzyl 1-(2-pyrrolidinone)carbodithioate, benzyl (1,2-benzenedicarboximido) carbodithioate, 2-cyanoprop-2-yl 1-pyrrolecarbodithioate, 2-cyanobut-2-yl 1-pyrrolecarbodithioate, benzyl 1-imidazolecarbodithioate, N,N-dimethyl-S-(2-cyanoprop-2-yl)dithiocarbamate, N,N-diethyl-S-benzyl dithiocarbamate, cyanomethyl 1-(2-pyrrolidone) carbodithioate, cumyl dithiobenzoate, 2-dodecylsulphanylthiocarbonylsulphanyl-2-methyl-propionic acid butyl ester, O-phenyl-S-benzyl xanthate, N,N-diethyl S-(2-ethoxy-carbonylprop-2-yl)dithiocarbamate, dithiobenzoic acid, 4-chlorodithiobenzoic acid, O-ethyl-S-(1-phenylethyl)xanthtate, O-ethyl-S-(2-(ethoxycarbonyl)prop-2-yl)xanthate, O-ethyl-S-(2-cyanoprop-2-yl) xanthate, O-ethyl-S-(2-cyanoprop-2-yl)xanthate, O-ethyl-S-cyanomethyl xanthate, O-pentafluorophenyl-S-benzyl xanthate, 3-benzylthio-5,5-dimethylcyclohex-2-ene-1-thione or benzyl 3,3-di(benzylthio)prop-2-enedithioate, S,S'-bis-($\alpha,\alpha'$-disubstituted-$\alpha''$-acetic acid)-trithiocarbonate, S,S'-bis-($\alpha,\alpha'$-disubstituted-$\alpha''$-acetic acid)-trithiocarbonate or S-alkyl-S'-($\alpha,\alpha'$-disubstituted-$\alpha''$-acetic acid)-trithiocarbonates, benzyl dithiobenzoate, 1-phenylethyl dithiobenzoate, 2-phenylprop-2-yl dithiobenzoate, 1-acetoxyethyl dithiobenzoate, hexakis(thiobenzoylthiomethyl)benzene, 1,4-bis(thiobenzoylthiomethyl)benzene, 1,2,4,5-tetrakis(thiobenzoylthiomethyl)benzene, 1,4-bis-(2-(thiobenzoylthio)prop-2-yl)benzene, 1-(4-methoxyphenyl)ethyl dithiobenzoate, benzyl dithioacetate, ethoxycarbonylmethyl dithioacetate, 2-(ethoxycarbonyl)prop-2-yl dithiobenzoate, 2,4,4-trimethylpent-2-yl dithiobenzoate, 2-(4-chlorophenyl) prop-2-yl dithiobenzoate, 3-vinylbenzyl dithiobenzoate, 4-vinylbenzyl dithiobenzoate, S-benzyl diethoxyphosphinyldithioformate, tert-butyl trithioperbenzoate, 2-phenylprop-2-yl 4-chlorodithiobenzoate, 2-phenylprop-2-yl 1-dithionaphthalate, 4-cyanopentanoic acid dithiobenzoate, dibenzyl tetrathioterephthalate, dibenzyl trithiocarbonate, carboxymethyl dithiobenzoate or poly(ethylene oxide) with dithiobenzoate end group or mixtures thereof.

In one embodiment a suitable RAFT chain transfer agent includes 2-dodecylsulphanylthiocarbonylsulphanyl-2-methyl-propionic acid butyl ester, cumyl dithiobenzoate or mixtures thereof.

The RAFT polymer may comprise at least one of (a) a polymer derived from monomers comprising: (i) a vinyl aromatic monomer; and (ii) a carboxylic monomer (typically maleic anhydride, maleic acid, (meth)acrylic acid, itaconic anhydride or itaconic acid) or derivatives thereof; (b) a poly (meth)acrylate; (c) a functionalised polyolefin; (d) an ethylene vinyl acetate copolymer; (e) a fumarate copolymer; (f) a copolymer derived from (i) an $\alpha$-olefin and (ii) a carboxylic monomer (typically maleic anhydride, maleic acid, (meth)

acrylic acid, itaconic anhydride or itaconic acid) or derivatives thereof, or (g) mixtures thereof. In one embodiment the RAFT polymer with pendant groups comprises a polymethacrylate or mixtures thereof.

When the RAFT polymer is a polymethacrylate, the RAFT polymer may be derived from a monomer composition comprising:

(a) 50 wt % to 100 wt % (or 65 wt % to 95 wt %) of an alkyl methacrylate, wherein the alkyl group of the methacrylate has 10 to 30, or 10 to 20, or 12 to 18, or 12 to 15 carbon atoms;

(b) 0 wt % to 40 wt % (or 5 wt % to 30 wt %) of an alkyl methacrylate, wherein the alkyl group of the methacrylate has 1 to 9, or 1 to 4 carbon atoms (for example methyl, butyl, or 2-ethylhexyl); and (c) 0 wt % to 10 wt % (or 0 wt % to 5 wt % or 0 wt %) of a nitrogen-containing monomer.

In one embodiment the RAFT polymer is a polymethacrylate block copolymer containing two or more blocks, wherein the composition of the first block may be derived from a monomer composition comprising:

(a) 50 wt % to 100 wt % (or 65 wt % to 95 wt %) of an alkyl methacrylate, wherein the alkyl group of the methacrylate has 10 to 30, or 10 to 20, or 12 to 18, or 12 to 15 carbon atoms;

(b) 0 wt % to 40 wt % (or 5 wt % to 30 wt %) of an alkyl methacrylate, wherein the alkyl group of the methacrylate has 1 to 9, or 1 to 4 carbon atoms (for example methyl, butyl, or 2-ethylhexyl); and (c) 0 wt % to 10 wt % (or 0 wt % to 5 wt %, or 0 wt %) of a nitrogen-containing monomer;

and wherein the second block, which may be different from the first block, may be derived from a monomer composition comprising:

(a) 50 wt % to 80 wt % of an alkyl methacrylate, wherein the alkyl group of the methacrylate has 10 to 30, or 10 to 20, or 12 to 18, or 12 to 15 carbon atoms;

(b) 20 wt % to 100 wt % of an alkyl methacrylate, wherein the alkyl group of the methacrylate has 1 to 9, or 1 to 4 carbon atoms; and (c) 0 wt % to 10 wt % (or 0 wt % to 5 wt %) of a nitrogen-containing monomer.

The alkyl (meth)acrylate includes for example compounds derived from saturated alcohols, such as methyl methacrylate, butyl methacrylate, 2-methylpentyl, 2-propylheptyl, 2-butyloctyl, 2-ethylhexyl (meth)acrylate, octyl (meth)acrylate, nonyl (meth)acrylate, isooctyl (meth)acrylate, isononyl (meth)acrylate, 2-tert-butylheptyl (meth)acrylate, 3-isopropylheptyl (meth)acrylate, decyl (meth)acrylate, undecyl (meth)acrylate, 5-methylundecyl (meth)acrylate, dodecyl (meth)acrylate, 2-methyldodecyl (meth)acrylate, tridecyl (meth)acrylate, 5-methyltridecyl (meth)acrylate, tetradecyl (meth)acrylate, pentadecyl (meth)acrylate, hexadecyl (meth)acrylate, 2-methylhexadecyl (meth)acrylate, heptadecyl (meth)acrylate, 5-isopropylheptadecyl (meth)acrylate, 4-tert-butyloctadecyl (meth)acrylate, 5-ethyloctadecyl (meth)acrylate, 3-isopropyloctadecyl-(meth)acrylate, octadecyl (meth)acrylate, nonadecyl (meth)acrylate, eicosyl (meth)acrylate, cetyleicosyl (meth)acrylate, stearyleicosyl (meth)acrylate, docosyl (meth)acrylate and/or eicosyltetratriacontyl (meth)acrylate; (meth)acrylates derived from unsaturated alcohols, such as oleyl (meth)acrylate; and cycloalkyl (meth)acrylates, such as 3-vinyl-2-butylcyclohexyl (meth)acrylate or bornyl (meth)acrylate.

The alkyl (meth)acrylates with long-chain alcohol-derived groups may be obtained, for example, by reaction of a (meth)acrylic acid (by direct esterification) or methyl methacrylate (by transesterification) with long-chain fatty alcohols, in which reaction a mixture of esters such as (meth)acrylate with alcohol groups of various chain lengths is generally obtained. These fatty alcohols include Oxo Alcohol® 7911, Oxo Alcohol® 7900 and Oxo Alcohol® 1100 of Monsanto; Alphanol® 79 of ICI; Nafol® 1620, Alfol® 610 and Alfol® 810 of Condea (now Sasol); Epal® 610 and Epal® 810 of Ethyl Corporation; Linevol® 79, Linevol® 911 and Dobanol® 25 L of Shell AG; Lial® 125 of Condea Augusta, Milan; Dehydad® and Lorol® of Henkel KGaA (now Cognis) as well as Linopol® 7-11 and Acropol® 91 of Ugine Kuhlmann.

In one embodiment the RAFT polymer is further functionalised in the core or the polymeric arms with a nitrogen-containing monomer. The nitrogen-containing monomer may include a vinyl-substituted nitrogen heterocyclic monomer, a dialkylaminoalkyl (meth)acrylate monomer, a dialkylaminoalkyl (meth)acrylamide monomer, a tertiary-(meth)acrylamide monomer or mixtures thereof. In one embodiment the RAFT polymer is not further functionalised in the core or the polymeric arms with a nitrogen-containing monomer.

In one embodiment the core or polymeric arms further comprise a (meth)acrylamide or a nitrogen containing (meth)acrylate monomer that may be represented by the formula:

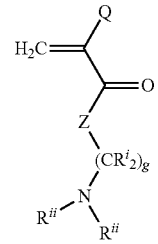

wherein
Q is hydrogen or methyl and, in one embodiment, Q is methyl;
Z is an N—H group or O (oxygen);
each $R^{ii}$ is independently hydrogen or a hydrocarbyl group (typically alkyl) containing 1 to 8, or 1 to 4 carbon atoms;
each $R^i$ is independently hydrogen or a hydrocarbyl group (typically alkyl) containing 1 to 2 carbon atoms and, in one embodiment, each $R^1$ is hydrogen; and
g is an integer from 1 to 6 and, in one embodiment, g is 1 to 3.

Examples of a suitable nitrogen-containing monomer include N,N-dimethylacrylamide, N-vinyl carbonamides such as N-vinyl-formamide, vinyl pyridine, N-vinylacetoamide, N-vinyl-n-propionamides, N-vinyl hydroxyacetoamide, N-vinyl imidazole, N-vinyl pyrrolidinone, N-vinyl caprolactam, dimethylaminoethyl acrylate (DMAEA), dimethylamino-ethylmethacrylate (DMAEMA), dimethylaminobutylacrylamide, dimethylaminepropylmethacrylate (DMAPMA), dimethylamine-propyl-acrylamide, dimethylaminopropyl-methacrylamide, dimethylaminoethyl-acrylamide or mixtures thereof.

The RAFT polymer may be present in the lubricant at ranges including 0.01 wt % to 60 wt %, or 0.5 wt % to 60 wt % of the lubricant.

Oils of Lubricating Viscosity

The lubricating composition comprises an oil of lubricating viscosity. Such oils include natural and synthetic oils, oil derived from hydrocracking, hydrogenation, and hydrofinishing, unrefined, refined and re-refined oils and mixtures thereof.

Unrefined oils are those obtained directly from a natural or synthetic source generally without (or with little) further purification treatment.

Refined oils are similar to the unrefined oils except they have been further treated in one or more purification steps to improve one or more properties. Purification techniques are known in the art and include solvent extraction, secondary distillation, acid or base extraction, filtration, percolation and the like.

Re-refined oils are also known as reclaimed or reprocessed oils, and are obtained by processes similar to those used to obtain refined oils and often are additionally processed by techniques directed to removal of spent additives and oil breakdown products.

Natural oils useful in making the inventive lubricants include animal oils, vegetable oils (e.g., castor oil, lard oil), mineral lubricating oils such as liquid petroleum oils and solvent-treated or acid-treated mineral lubricating oils of the paraffinic, naphthenic or mixed paraffinic-naphthenic types and oils derived from coal or shale or mixtures thereof.

Synthetic lubricating oils are useful and include hydrocarbon oils such as polymerised and interpolymerised olefins (e.g., polybutylenes, polypropylenes, propyleneisobutylene copolymers); poly(1-hexenes), poly(1-octenes), poly(1-decenes), and mixtures thereof, alkyl-benzenes (e.g. dodecylbenzenes, tetradecylbenzenes, dinonylbenzenes, di-(2-ethylhexyl)benzenes); polyphenyls (e.g., biphenyls, terphenyls, alkylated polyphenyls); alkylated diphenyl ethers and alkylated diphenyl sulphides and the derivatives, analogs and homologs thereof or mixtures thereof.

Other synthetic lubricating oils include polyol esters (such as Prolube® 3970), diesters, liquid esters of phosphorus-containing acids (e.g., tricresyl phosphate, trioctyl phosphate, and the diethyl ester of decane phosphonic acid), or polymeric tetrahydrofurans. Synthetic oils may be produced by Fischer-Tropsch reactions and typically may be hydroisomerised Fischer-Tropsch hydrocarbons or waxes. In one embodiment oils may be prepared by a Fischer-Tropsch gas-to-liquid synthetic procedure as well as other gas-to-liquid oils.

Oils of lubricating viscosity may also be defined as specified in the American Petroleum Institute (API) Base Oil Interchangeability Guidelines. The five base oil groups are as follows: Group I (sulphur content >0.03 wt %, and/or <90 wt % saturates, viscosity index 80-120); Group II (sulphur content ≦0.03 wt %, and ≧90 wt % saturates, viscosity index 80-120); Group III (sulphur content ≦0.03 wt %, and ≧90 wt % saturates, viscosity index ≧120); Group IV (all polyalphaolefins (PAOs)); and Group V (all others not included in Groups I, II, III, or IV). The oil of lubricating viscosity comprises an API Group I, Group II, Group III, Group IV, Group V oil or mixtures thereof. Often the oil of lubricating viscosity is an API Group I, Group II, Group III, Group IV oil or mixtures thereof. Alternatively the oil of lubricating viscosity is often an API Group II, Group III or Group IV oil or mixtures thereof.

The amount of the oil of lubricating viscosity present is typically the balance remaining after subtracting from 100 wt % the sum of the amount of the RAFT polymer and the other performance additives.

The lubricating composition may be in the form of a concentrate and/or a fully formulated lubricant. If the RAFT polymer, is in the form of a concentrate (which may be combined with additional oil to form, in whole or in part, a finished lubricant), the ratio of the of components the RAFT polymer to the oil of lubricating viscosity and/or to diluent oil include the ranges of 1:99 to 99:1 by weight, or 80:20 to 10:90 by weight.

Other Performance Additive

The composition of the invention optionally further includes at least one other performance additive. The other performance additives include metal deactivators, detergents, viscosity index improvers (that is, viscosity modifiers other than the RAFT polymer of the invention), extreme pressure agents (typically sulphur- and/or phosphorus-containing), antiwear agents (other than the RAFT polymer of the invention), antioxidants (such as hindered phenols, aminic antioxidants or molybdenum compounds), corrosion inhibitors, foam inhibitors, demulsifiers, pour point depressants, seal swelling agents and mixtures thereof.

A more detailed description of suitable other performance additives listed above may be found in U.S. Patent Applications 60/745,422 (describes driveline additives, particularly for automatic or manual transmissions), 60/745,420 (describes driveline additives, particularly for gear oils or axle oils), 60/74517 (describes additives for hydraulic fluids), and 60/745,425 (describes additives, for internal combustion lubricants).

Industrial Application

The antiwear performance of the RAFT polymer of the invention may be useful for a lubricant suitable for lubricating a variety of mechanical devices. The mechanical device includes at least one of an internal combustion engine (for crankcase lubrication), a hydraulic system, or a driveline system.

Typically the driveline system utilises a driveline lubricant selected from the group consisting of an axle oil, a gear oil, a gearbox oil, a traction drive transmission fluid, an automatic transmission fluid or a manual transmission fluid.

The automatic transmission includes continuously variable transmissions (CVT), infinitely variable transmissions (IVT), Toroidal transmissions, continuously slipping torque converted clutches (CSTCC), stepped automatic transmissions or dual clutch transmissions (DCT).

Typically, the hydraulic system utilises a hydraulic fluid (which may be a piston pump fluid or a vane pump fluid), and an internal combustion engine utilizes an engine lubricant.

The RAFT polymer may be present in a lubricant for a gear oil or axle fluid at 2 to about 60 wt %, or about 5 to about 50 wt %, or about 10 to about 40 wt % of the lubricant.

The RAFT polymer may be present in a lubricant for an automatic transmission fluid of 0.5 wt % to 12 wt %, or 1 wt % to 10 wt %, or 2 wt % to 8 wt % of the lubricant.

The RAFT polymer may be present in a lubricant for hydraulic fluid at 0.01 wt % to 12 wt %, or 0.05 wt % to 10 wt %, or 0.075 wt % to 8 wt % of the lubricant.

The RAFT polymer may be present in a lubricant for an internal combustion engine at 0.01 to 12 wt %, or 0.05 wt % to 10 wt %, or 0.075 to 8 wt % of the lubricant.

Phosphorus compounds are often the primary antiwear agent in a lubricant, typically a zinc dialkyldithiophosphate (ZDDP) in engine oil and hydraulic fluids, an ashless ester like dibutyl phosphite in automatic transmission fluids and an amine salt of an alkylphosphoric acid in gear oils. For various reasons the amount of phosphorus compound used is often reduced, to minimize environmental impact for example. In engine oils the amount of phosphorus (typically supplied as ZDDP) may be less than 0.08% by weight P in the finished lubricant, or 0.02-0.06% by weight P. In hydraulic fluids, automatic transmission fluids and gear oils, the phosphorus level may be even lower, such as 0.05 or less, or 0.01-0.04 or 0.01-0.03% by weight P. The RAFT polymer and its antiwear boosting ability may provide significant advantage in low-phosphorus lubricants. In such lubricants the wear protection may be inadequate or only marginal with the phosphorus compound in the absence of the RAFT polymer. In hydraulic fluids the advantage of the RAFT polymers over conventional viscosity modifiers may be especially pronounced in the anti-wear performance after shear.

The following examples provide illustrations of the invention. These examples are non exhaustive and are not intended to limit the scope of the invention.

EXAMPLES

Preparative Example 1

(PREP 1) is prepared in a vessel equipped with a nitrogen inlet flowing at about 28.3 L/hr, medium speed mechanical stirrer, a thermocouple and a water-cooled condenser is charged with about 80 g of $C_{12-15}$ alkyl methacrylate, about 20 g of methyl methacrylate, about 0.55 g of Trigonox™-21 (initiator), about 4.07 g of 2-dodecylsulphanylthiocarbonyl-sulphanyl-2-methyl-propionic acid dodecyl ester (chain transfer agent) and about 48.2 g of oil. The contents of the vessel are stirred under a nitrogen blanket for about 20 minutes to ensure sufficient mixing. The nitrogen flow is reduced to about 14.2 L/hr and the mixture is set to be heated to about 90° C. for about 3 hours. About 6.05 g of ethylene glycol dimethacrylate is added to the vessel and the mixture is stirred at about 90° C. for an additional about 3 hours. The resultant product is a mixture of polymers and is then cooled to ambient temperature. The major product fraction is characterised as having a weight average molecular weight of about 283,300 g/mol and having a number average molecular weight of about 215,900 g/mol. The polymer is believed to have at least 9 polymeric arms (containing about 80 wt % of $C_{12-15}$ alkylmethacrylate, about 20 wt % of methyl methacrylate) and the conversion to a star polymer is 72%, i.e., 28% of the linear polymer chains remaining uncoupled.

Example 1

(EX1): is a hydraulic fluid is prepared by blending 4 wt % of RAFT star polymer (as prepared by PREP1), and other known hydraulic components including phenolic antioxidant, tolyltriazole, phosphorus-containing antiwear agent. The other known components are added in conventional amounts. The oil of lubricating viscosity is a mixture of 600 N base oil (3.8 wt % of the hydraulic fluid), and 150 N base oil (90.2 wt % of the hydraulic fluid).

Comparative Example 1

(CE1): is a hydraulic fluid similar to EX1, except the RAFT star polymer is replaced with a commercially available non-RAFT linear viscosity modifier (present at 5.1 wt % of the lubricant) suitable for hydraulic fluids, and the oil of lubricating viscosity is a mixture of 600 N base oil (14.1 wt % of the hydraulic fluid), and 150 N base oil (80.2 wt % of the hydraulic fluid).

Both EX1 and CE1 have similar SSI.

Denison HF—O Test: EX1 and CE1 are evaluated in a Denison hybrid hydraulic pump test following procedure HF-O. The test is run for 600 hours. The test is subdivided into two 300 hours portions. The lubricant in the first portion does not contain water. The second portion adds 1 wt % of water to the lubricant. The results obtained from the HF-O test in the first portion indicate that weight loss of vanes, rings, and pins are similar for both EX1 and CE1. The results obtained for the second portion are:

| HF-O Parameter | CE1 | EX1 |
|---|---|---|
| Vanes Weight Loss (mg) | 2.1 | 0.1 |
| Ring Weight Loss (mg) | 216 | 55 |
| Pin Weight Loss (mg) | 0.9 | 0 |

Wear Test: High Frequency Reciprocating Rig (HFRR): EX1 and CE1 are evaluated by heating a sample isothermally at 40° C. for 15. The sample is then heated to 160° C. at a rate of 2° C. per minute. The load is 500 g, the frequency is 20 Hz, and the stroke length is 1000 μm. The results obtained are shown below in the table (column heading "Before Shear").

Samples of EX1 and CE1 are subjected to a 20 hour KRL test (Volkswagen Tapered Bearing Roller Test). The test procedure is set out in both CEC-L-45-A-99 and DIN 51350-6-KRL/C. The samples are then evaluated in HFRR by employing the procedure highlighted above. The results obtained are shown below in the table (column heading "After Shear").

| | Before Shear | | After Shear | |
|---|---|---|---|---|
| Example | EX1 | CE1 | EX1 | CE1 |
| Diameter of Average Wear Scar (μm) | 279 | 294 | 241 | 334 |
| Film Thickness (%) | 1 | 0 | 22 | 0 |

The HFRR data demonstrates that the wear scar and film thickness of the lubricant EX1 and CE1 are similar before shearing. However, the wear performance of a lubricant containing the RAFT polymer provides improved wear resistance after shear.

Overall, the data obtained indicates that a lubricant containing the RAFT polymer has antiwear activity capable of providing acceptable wear performance over the general lubricant change cycle, whilst not having a detrimental impact on at least one of viscosity index (VI), oil blend thickening capabilities, fuel economy, shear stability, low temperature viscosity performance, and viscosity modifier treatment level.

It is known that some of the materials described above may interact in the final formulation, so that the components of the final formulation may be different from those that are initially added. The products formed thereby, including the products formed upon employing lubricant composition of the present invention in its intended use, may not be susceptible of easy description. Nevertheless, all such modifications and reaction products are included within the scope of the present invention; the present invention encompasses lubricant composition prepared by admixing the components described above.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A method of controlling wear in a mechanical device, the method comprising supplying to the mechanical device a lubricant comprising (i) a polymer obtained from a reversible addition-fragmentation chain transfer controlled radical polymerisation process, and (ii) an oil of lubricating viscosity, wherein the polymer has random or tapered block architecture, wherein the polymer is a linear or star polymer.

2. The method of claim 1, wherein the polymer is a star polymer.

3. The method of claim 1, wherein the polymer is a copolymer.

4. The method of claim 1, wherein the polymer is derived from about 20 wt % or more of a mono-vinyl monomer.

5. The method of claim 1, wherein the polymer is derived from about 50 wt % or more of a mono-vinyl monomer.

6. The method of claim 1, wherein the polymer is a star polymer, and wherein the star polymer has 5 or more arms.

7. The method of claim 1, wherein the polymer is a star polymer, and wherein the star polymer has 6 to about 30 arms.

8. The method of claim 1, wherein the polymer is a star polymer, and wherein the star polymer has 8 to about 14 arms.

9. The method of claim 1, wherein the polymer has a weight average molecular weight of about 1,000 to about 1,000,000.

10. The method of claim 1, wherein the lubricant is at least one of an internal combustion engine lubricant, a hydraulic fluid, or a driveline fluid.

11. The method of claim 10, wherein the lubricant is a driveline fluid selected from the group consisting of a gear oil, an axle oil, a traction drive transmission fluid, an automatic transmission fluid and a manual transmission fluid.

12. The method of claim 10, wherein the lubricant is a hydraulic fluid selected from the group consisting of piston pump fluids and vane pump fluids.

13. The method of claim 1, wherein the polymer is present at about 0.5 wt % to about 60 wt % of the lubricant.

* * * * *